United States Patent [19]
Rowland et al.

[11] Patent Number: 5,486,831
[45] Date of Patent: Jan. 23, 1996

[54] MULTI-MODE MISSILE SEEKER WITH ADJUNCT SENSOR BLOCKING AN ELECTRONICALLY SCANNED RADIO FREQUENCY APERTURE USING AN OFF-BORESIGHT DIRECTION FINDING PROCESS

[76] Inventors: Landon L. Rowland, Rte. 4, Box 75070, McKinney, Tex. 75070; Richard K. Lowder, #8 Creek Ski Lake, Rte. 4, Sherman, Tex. 75429; Lester W. Dyer, 3301 Snidow Ct., Plano, Tex. 75025-5362; Charles H. Turner, 120 Forest Hollow, Argyle, Tex. 76126

[21] Appl. No.: 420,616

[22] Filed: Apr. 12, 1995

Related U.S. Application Data

[63] Continuation of Ser. No. 231,008, Apr. 21, 1994, abandoned.

[51] Int. Cl.⁶ ............................. G01S 13/44; G01S 13/72
[52] U.S. Cl. .............................. 342/62; 342/80; 342/149; 342/154; 342/158
[58] Field of Search ........................... 342/62, 80, 149, 342/154, 157, 158

[56] References Cited

U.S. PATENT DOCUMENTS

| | | | |
|---|---|---|---|
| 4,131,254 | 12/1978 | Underwood | 244/3.16 |
| 4,136,343 | 1/1979 | Heffner et al. | 244/3.19 X |
| 4,215,347 | 7/1980 | Jarrell et al. | 342/427 |
| 4,562,439 | 12/1985 | Peralta et al. | 342/81 |
| 4,679,748 | 7/1987 | Blomqvist et al. | 244/3.19 |
| 4,700,193 | 10/1987 | Sa et al. | 342/427 |
| 4,980,925 | 12/1990 | Blustine et al. | 455/327 |
| 5,021,796 | 6/1991 | Corzine et al. | 343/712 |
| 5,030,962 | 7/1991 | Rees | 343/700 MS |
| 5,061,930 | 10/1991 | Nathansonn et al. | 342/13 |
| 5,064,141 | 11/1991 | Nesline, Jr. | 244/3.15 |
| 5,282,013 | 1/1994 | Gregoris | 244/3.16 X |
| 5,307,077 | 4/1994 | Branigan et al. | 343/720 |
| 5,341,145 | 8/1994 | Eckersten et al. | 342/148 |

*Primary Examiner*—John B. Sotomayor
*Attorney, Agent, or Firm*—Rene' E. Grossman; Richard L. Donaldson

[57] ABSTRACT

A multi-mode seeker which comprises a stationary antenna and electronic circuitry responsive to signals received by the antenna to cause the antenna to scan a field of view determined by the signals received by the antenna. The seeker has a nose region positioned at the forward portion thereof and an adjunct sensor disposed in the nose region ahead of the antenna. The electronic circuitry includes circuitry for performing a Sum/Delta monopulse processing technique on the signals received by the antenna the Sum/Delta monopulse processing including calculating each of a standard Sum signal, Delta-Azimuth signal and Delta-Elevation signal. The seeker has a boresight axis, the center of the field of view being off boresight, in general. The seeker has a field of regard, the field of regard having plural sectors, each of the sectors having separate predefined compensation.

21 Claims, 3 Drawing Sheets

SYSTEM CONFIGURATION

DF PROCEDURE

SYSTEM CONFIGURATION $DF = \frac{\Delta}{\Sigma}$

TO GUIDANCE

DF PROCEDURE

COMPENSATION AND DF PROCESS

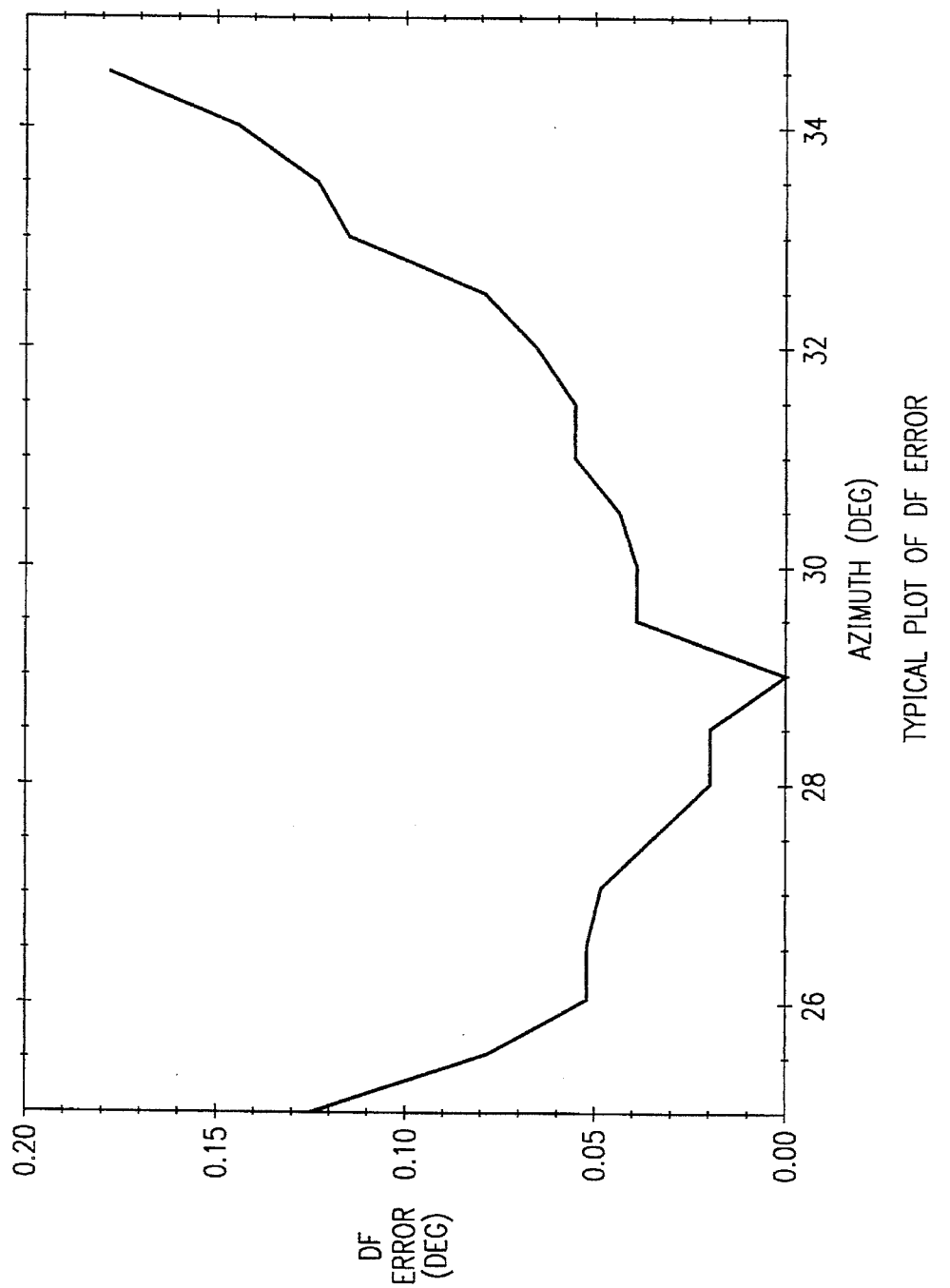

MULTI-MODE MISSILE SEEKER WITH ADJUNCT SENSOR BLOCKING AN ELECTRONICALLY SCANNED RADIO FREQUENCY APERTURE USING AN OFF-BORESIGHT DIRECTION FINDING PROCESS

This application is a Continuation of application Ser. No. 08/231,008, filed Apr. 21, 1994 now abandoned.

BACKGROUND OF THE INVENTION

1. Field of the Invention

This invention relates to multi-mode missile seeker systems which require the placement of an adjunct sensor in the missile nose, thus blocking the primary radio frequency (RF) aperture and to the specific direction finding (DF) processing techniques implemented to overcome the blocking problem. More specifically, the invention relates to an electronically scanned RF aperture utilizing an off-boresight DF processing technique to overcome effects from the blocking problem in the missile nose presented by the adjunct sensor.

2. Brief Description of the Prior Art

In the prior art, the traditional method of solving the missile DF problem has been to use a gimballed antenna with a null-tracking DF processing technique. A null-tracking gimbal system strives to keep the antenna null pointed at the target and typically uses an inertial unit to obtain the required DF information. This type of system requires a mechanical gimbal that is constantly moving to keep the target in the null and any error in positioning of the null translates directly into DF error. The addition of an adjunct sensor to this type of system distorts the beam due to blockage and diffraction effects and, thus, causes the antenna null position to shift. This null shift results in large DF errors that prevent this type of system from achieving accurate DF performance.

The current art is replacing the prior art antenna with phased arrays.

The addition of an alternate mode of operation to a missile seeker with a primary RF mode of operation is very desirable to diversify the mission capabilities of the missile. The integration of an adjunct sensor into the nose of a missile vehicle is a straightforward method of adding an additional mode of operation to a missile with a primary RF tracking aperture. The adjunct sensor can represent an infrared, laser, millimeter-wave or any other mode of operation sensor which requires mounting in the front of the missile. The integration of the adjunct sensor with the primary RF aperture presents a variety of design challenges in both the mechanical and electrical arenas.

In terms of electrical performance, the RF aperture is required to maintain adequate performance while a significant portion of the aperture is blocked by the adjunct sensor. A primary measure of electrical performance is the ability to provide accurate DF estimation of a target location. This ability is adversely affected by the addition of the adjunct sensor, often to the point where no useful DF information can be obtained from the primary RF aperture.

SUMMARY OF THE INVENTION

In accordance with the present invention, the deficiencies of the prior art are eliminated and there is provided a solution to the multi-mode seeker DF problem. The gimbal is no longer used to position the antenna, the antenna beam being electronically positioned by electronically changing the phasing of each of the elements of the phased array antenna. By this method, rather than repositioning the antenna with change in target position relative to the missile, the electronic system can keep track of the target location within the beam.

The above is accomplished by using an electronically scanned RF aperture mounted behind the adjunct sensor along with an off-boresight DF processing technique.

The RF aperture is an electronically scanned phased array mounted such that its axis is co-located with the axis of the missile body. The adjunct sensor is essentially mounted directly in front of the RF aperture, with some space therebetween. The antenna beam is electronically scanned in known manner to discrete positions in space, dependent upon the target location. Each beam covers a specific spatial area, referred to as the field of view (FOV) of the beam. The sum total of all the beam positions and their respective FOVs completely covers the entire area of interest, or field of regard (FOR). A particular beam is used while the target remains within the beam FOV. When the target moves outside of the FOV of that particular beam, a new beam position is used which will again contain the target within its FOV. In this manner, the beams are continually switched to track the target within the FOR of the missile. This method of tracking is vastly different from the null-tracking systems in that the target is permitted to move off of the beam center by an amount determined by the beam FOV. In contrast, the null-tracking system continually strives to maintain the antenna beam directly on the target and essentially derives its DF information from the mechanical position of the gimbal.

The number of allowable beam positions or the resolution of the beam scan locations is determined by the number of bits in the array phase shifters. The resolution can be increased or decreased by varying the number of bits used. The beam FOV is determined both by the beamwidth of the antenna along with the beam scan resolution. A narrow beam generally results in a narrow FOV, but the FOV must be large enough to cover the area assigned to a particular beam, this being a function of the beam scan resolution.

The off-boresight DF processing method is a technique that performs DF over the entire beam FOV, regardless of where the target may be within the FOV. This technique matches very well with the method of operation of the electronically scanned RF aperture. The system is first compensated by scanning the antenna beam to a particular point in space and measuring the DF response as a target is swept through the beam FOV. A fit is then performed to model the DF response versus the target position, resulting in a set of compensation values for that particular beam position. In the actual DF process, the compensation values are retrieved from a compensation table for the current beam position. These compensation values are then used along with the measured DF response to obtain an estimate of the target location.

The technique eliminates the null-position shift error of the null-tracking system because the absolute position of the null is not the driving factor in the DF performance. If the null is shifted in the off-boresight processing, it merely results in an offset in the polynomial compensation and does not adversely affect the DF performance. This type of processing technique can possibly be utilized in a gimballed system, however, in reality, there are a number of practical limitations. The primary difficulty is that the gimbal would be required to move to discrete points in space almost instantaneously. This is an impossible task since a mechanical gimbal has associated inertia and cannot be moved quickly or smoothly enough to take advantage of the off-boresight processing technique.

In practice, the phased array antenna on a missile will scan a FOV which can and generally will be off boresight and will receive energy from the target, such energy being initially generated from the missile, from the target or from a source external to the missile and the target. The received signals from the target are then processed in standard manner to provide Sum, Delta-Azimuth and Delta-Elevation signals. These signals are further processed in standard manner to provide $DF_{AZ}$ and $DF_{EL}$ signals, the former being the ratio of the Delta-Azimuth signal to the Sum signal and the latter being the ratio of the Delta-Elevation signal to the Sum signal. The location of the target is thus known relative to the missile and the target is always positioned within the FOV of the antenna by electronic positioning of the antenna beam.

A FOV is part of the FOR. The FOR is divided into sectors with each sector having its own predetermined compensation stored in a data base. Accordingly, the compensation for the particular sector in question is included in the calculation for location of the target in well known manner. As is well known, in order to compensate for movement of the missile itself, a standard inertial navigation system (INS) can be provided on the missile so that the movement of the missile can be subtracted from the calculated position of the target, thereby providing accurate target positioning.

By use of the electronically scanned antenna system as above described, the problems encountered in the prior art in connection with the addition of the adjunct sensor in the nose of the missile are essentially eliminated.

BRIEF DESCRIPTION OF THE DRAWINGS

FIG. 4 is a typical plot of the DF error obtained for a particular beam scan location in accordance with the present invention.

DESCRIPTION OF THE PREFERRED EMBODIMENTS

Figure 1:
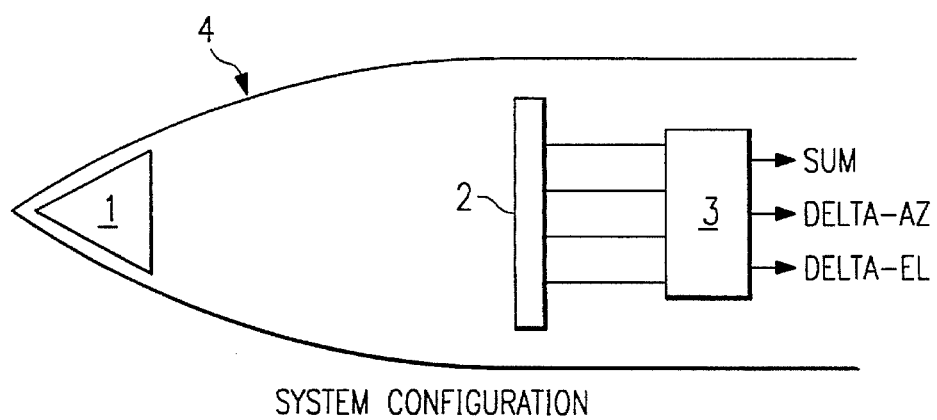
FIG. 1 is a schematic diagram of the system configuration of the RF aperture and the adjunct sensor in accordance with the present invention.

Referring first to FIG. 1, there is shown the missile seeker configuration in accordance with the present invention. An adjunct sensor 1 is mounted in the forward portion of the missile nose 4 and, in the preferred embodiment, has a diameter of approximately 3 inches. The RF aperture 2, which is a standard phased array in the preferred embodiment, is mounted approximately 9 inches behind the adjunct sensor 1 and on the missile axis. The aperture 2 in the preferred embodiment is an 84 element electronically scanned square phased array that measures 5.5 inches on a side. The outputs of the individual elements of the phased array 2 are passed through a standard array manifold architecture, which is part of the phased array structure 2, and are fed into a standard monopulse comparator 3. The outputs of the monopulse comparator 3 are the three beams measured by the system receiver, these beams being a Sum, Delta-Az and Delta-El. These beams are used to form the known complex ratios $DF_{AZ}$ and $DF_{EL}$ as discussed hereinabove which are used to derive the uncompensated DF information, as is well known to those skilled in the art. This information is utilized to electronically control the direction or FOV of the antenna in known manner and to track the target of interest as will be explained hereinbelow with reference to FIG. 2.

Figure 2:
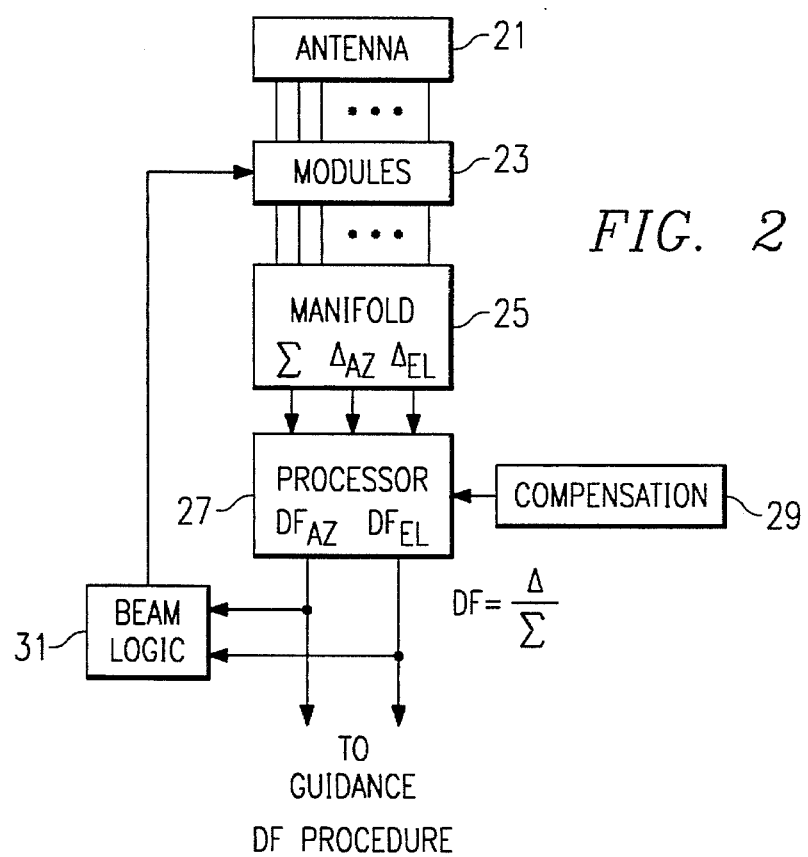
FIG. 2 is a block diagram of the DF or processing procedure in accordance with the present invention.

FIG. 2 demonstrates the procedure whereby the required information is obtained from the data received from the antenna. The antenna 21 can be a phased array similar to the antenna 2 shown in FIG. 1. The outputs of each of the elements of the antenna 21 are directed to modules 23 which include phase shifters and amplifiers. The phase shifted and amplified signals from the modules 23 are directed to a manifold 25 which combines the signals from the modules in standard and known manner to provide the sum, delta-AZ and delta-EL signals. These three signals from the manifold are then directed to a processor 27 which utilizes the three signals to provide the direction finding signals $DF_{AZ}$ and $DF_{EL}$ by a delta/sum ratio calculation as is well known. This provides the direction finding estimate in azimuth and elevation to provide guidance to the missile or the like being controlled. In order to provide accurate DF results, some compensation may be required, such as a look-up table or the like, this compensation generally but not necessarily being fed into the system prior to use and being shown by the block 29. The guidance signals $DF_{AZ}$ and $DF_{EL}$ are also utilized by beam steering logic 31 which readjusts the antenna beam by readjusting the phase shifters in the modules 23 or by providing other appropriate beam direction alteration to keep the target within the beam FOV.

Figure 3A:
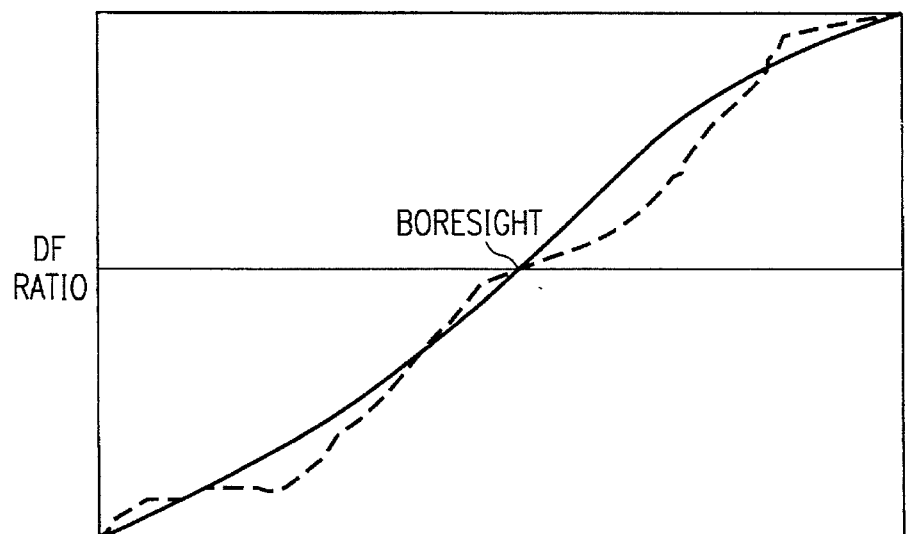
FIGS. 3a and 3b illustrate the compensation and DF processes in accordance with the present invention.
Figure 3B:
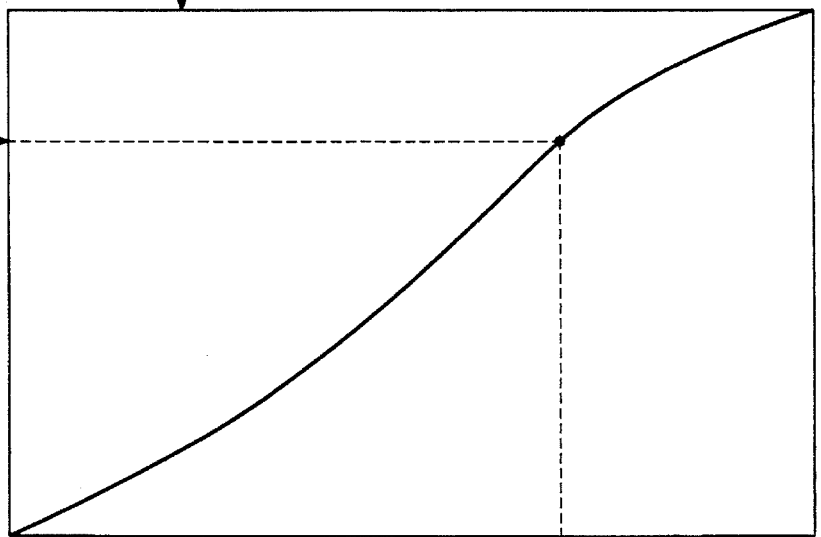

FIGS. 3a and 3b illustrate the processes of both generating the compensation and then using the compensation to generate a DF estimate in a single plane. FIG. 3a illustrates a typical DF ratio across a particular beam FOV along with the polynomial curve fit generated to model the ratio. The output of this process is the set of polynomial coefficients as is well known. FIG. 3b illustrates the use of these coefficients to reconstruct the modeled DF ratio and use the measured DF ratio as an input to determine a DF angle in known manner. This output DF angle is an accurate estimate of the target location. The process has been simplified to include only a single plane, however, in actual practice, the process will contain both the azimuth and elevation planes.

FIG. 4 illustrates a typical plot of DF error across the FOV of a single beam scan location. This particular beam is scanned 30 degrees off of the missile boresight in the azimuth direction. This particular scan was performed at a frequency of 10 GHz. It can be seen that the DF error over a ten degree range was, at most, less than about 0.20 degrees, this being well within the allowable tolerance and far superior to the results being obtained by prior art systems with a blocked aperture.

Though the invention has been described with respect to specific dimensions of the preferred embodiments thereof, many variations and modification will become apparent to those skilled in the art. It is therefore the intention that the appended claims be interpreted as broadly as possible in view of the prior art to include all such variations and modifications.

We claim:

1. A multi-mode seeker having a boresight which comprises:

(a) a housing having a nose region;

(b) an impediment to transmission of electromagnetic radiations disposed in said nose region along said boresight of said seeker;

(c) a stationary antenna disposed along said boresight and rearward of said impediment to transmission of electromagnetic radiations relative to the direction of radiations to and/or from said antenna, said impediment blocking transmissions along said boresight to and from said antenna, said antenna having a field of regard having an axis disposed along said boresight and capable of scanning each one of plural fields of view within said field of regard; and (d) electronic circuitry to cause said antenna to select one of said fields of view to scan responsive to said radiations received by said antenna.

2. A seeker as set forth in claim 1 wherein said electronic circuitry includes circuitry for performing a Sum/Delta monopulse processing technique on said signals received by said antenna.

3. A seeker as set forth in claim 2 wherein said Sum/Delta monopulse processing includes calculating each of a standard Sum signal, Delta-Azimuth signal and Delta-Elevation signal.

4. A seeker as set forth in claim 1 wherein the center of at least one of said fields of view is off boresight.

5. A seeker as set forth in claim 2 wherein the center of at least one of said fields of view is off boresight.

6. A seeker as set forth in claim 3 wherein the center of at least one of said fields of view is off boresight.

7. A seeker as set forth in claim 1, each of said fields of view having separate predefined compensation.

8. A seeker as set forth in claim 2, each of said fields of view having separate predefined compensation.

9. A seeker as set forth in claim 3, each of said fields of view having separate predefined compensation.

10. A seeker as set forth in claim 4, each of said fields of view having separate predefined compensation.

11. A seeker as set forth in claim 5, each of said fields of view having separate predefined compensation.

12. A seeker as set forth in claim 6, each of said fields of view having separate predefined compensation.

13. A multi-mode seeker having a boresight which comprises:

(a) a housing having a nose region;

(b) an impediment to transmission of electromagnetic radiations disposed in said nose region of said seeker;

(c) an antenna disposed rearward of said impediment to transmission of electromagnetic radiations relative to the direction of radiations to and/or from said antenna, said impediment blocking transmissions along said boresight to and from said antenna, said antenna having a field of regard and capable of scanning each one of plural fields of view within said field of regard; and (d) electronic circuitry to cause said antenna to select one of said fields of view to scan responsive to said radiations received by said antenna.

14. The seeker of claim 13 wherein said impediment is disposed along the boresight of said seeker.

15. The seeker of claim 13 wherein said antenna is stationary.

16. The seeker of claim 14 wherein said antenna is stationary.

17. The seeker of claim 13 wherein said antenna is disposed along the boresight of said seeker.

18. The seeker of claim 14 wherein said antenna is disposed along the boresight of said seeker.

19. The seeker of claim 15 wherein said antenna is disposed along the boresight of said seeker.

20. The seeker of claim 16 wherein said antenna is disposed along the boresight of said seeker.

21. The seeker of claim 13 wherein said field of regard has an axis disposed along said boresight.

* * * * *

UNITED STATES PATENT AND TRADEMARK OFFICE
CERTIFICATE OF CORRECTION

PATENT NO. : 5,486,831

DATED : January 23, 1996

INVENTOR(S) : Rowland et al

It is certified that error appears in the above-indentified patent and that said Letters Patent is hereby corrected as shown below:

On the title page, insert
item [73] to read --Texas Instruments Incorporated--

Signed and Sealed this

Eighth Day of July, 1997

Attest:

BRUCE LEHMAN

Attesting Officer

Commissioner of Patents and Trademarks